June 18, 1957 — R. H. FRANK — 2,795,958
MULTI-PURPOSE KITCHEN APPLIANCE
Filed Dec. 13, 1955 — 3 Sheets-Sheet 1
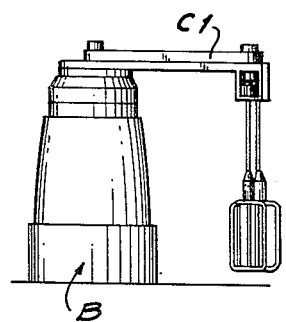
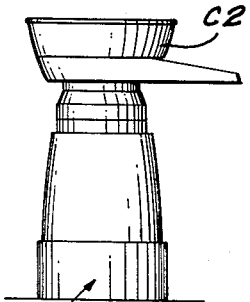
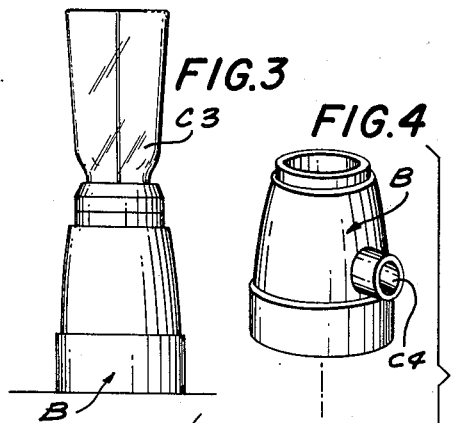
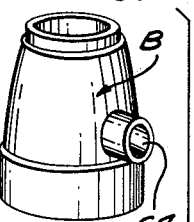
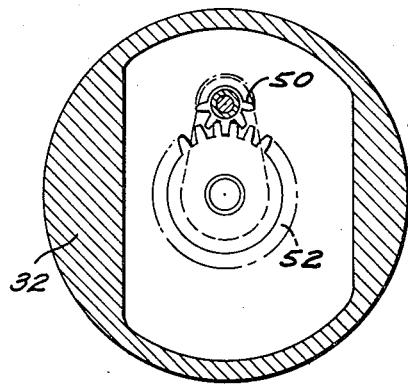
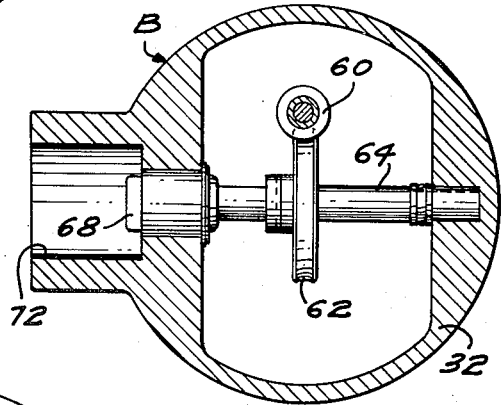
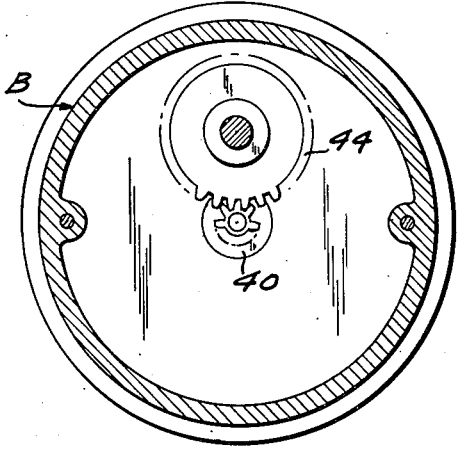
INVENTOR.
ROBERT H. FRANK
BY Harry Sangram
ATTORNEY

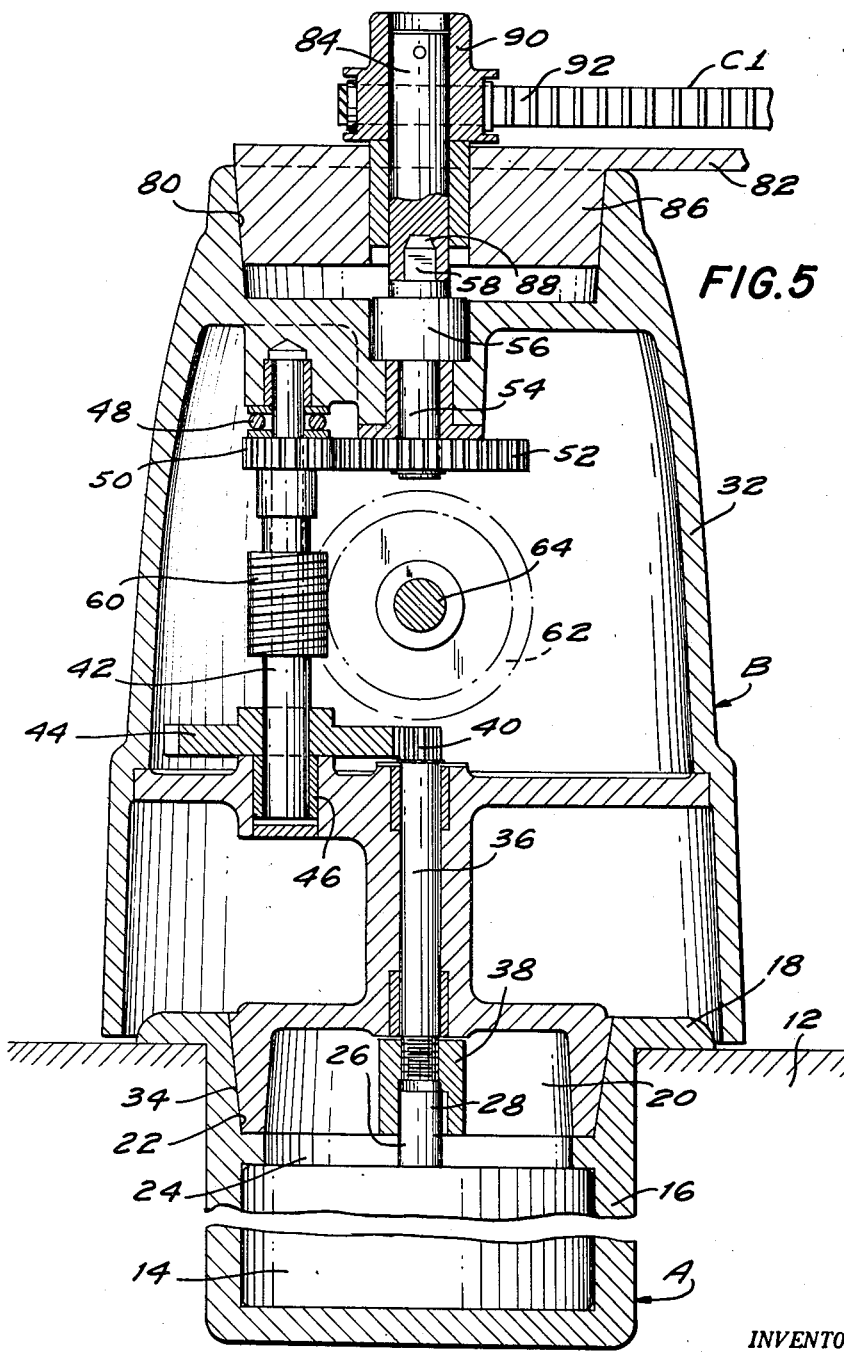

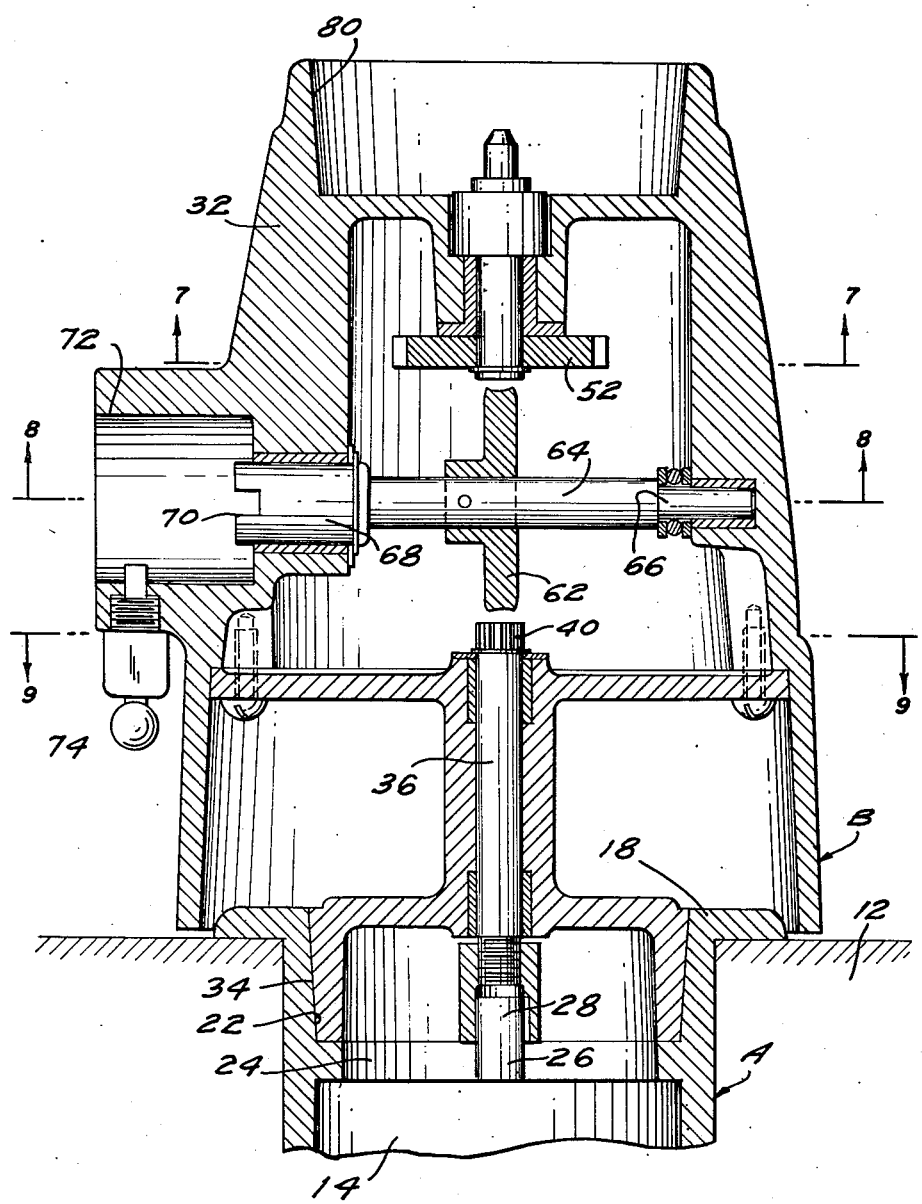

United States Patent Office 2,795,958
Patented June 18, 1957

2,795,958

MULTI-PURPOSE KITCHEN APPLIANCE

Robert H. Frank, Philadelphia, Pa., assignor to Enterprise Division of Silex Co., Philadelphia, Pa., a corporation of Connecticut Application December 13, 1955, Serial No. 552,844

3 Claims. (Cl. 74—16)

My invention relates to a cabinet multi-drive unit for operating kitchen appliances, and more particularly relates to a multi-purpose motor drive unit which is built within a table type kitchen cabinet and is capable of operating a plurality of electrical kitchen utensils, such as a cake mixer, juice extractor, juice blender, meat grinder, and the like.

In the present day mode of living with small apartments or houses in which there is a dearth of storage room, it has become increasingly necessary to use compact and convertible devices whereby one device may do the work of several, and when not in use at all, the device may be collapsed and fit within a small compact space. While it is primarily for kitchen use that the present invention has been designed, the device may just as well be used for many other purposes in its original state, and may be converted to serve further uses when desired.

Heretofore, motor driven kitchen appliances have been manufactured wherein the motor stand was carried by the housewife to a flat surface such as a table top, and adapted to the proper appliance by the housewife's inserting the desired utensil in its correct position. Inasmuch as the motor stand is of necessity a heavy and bulky unit, the housewife was burdened by constant stooping and carrying efforts. Furthermore, the motor stand itself occupied considerable space on the working surface and, therefore, restricted the housewife in her working area when the unit was in operation.

It is, therefore, an object of my invention to construct a multi-purpose motor drive unit which is enclosed within a table-type kitchen cabinet.

Another object of my invention is to provide a plurality of light and compact kitchen appliances which are adapted to be driven by the power drive unit within the cabinet and be operated at table top level.

Another object of my invention is to provide a power drive within a table-type cabinet for electrical kitchen appliances whereby the table top may be easily cleaned and the power drive unit protected from food spattering.

Another object of my invention is to provide a cabinet power drive for kitchen appliances which is useful for many purposes in its original state, and which may easily be converted to serve additional purposes such as metal and woodworking power tools.

Other objects of my invention are to provide an improved device of the character described, that is easily and economically produced, which is sturdy in construction, and which is highly efficient in operation.

With the above and related objects in view, my invention consists in the details of construction and combination of parts as will be more fully understood from the following description, when read in conjunction with the accompanying drawings, in which:

Fig. 1 is a side view of a food mixer appliance applied to a cabinet drive unit embodying my invention.

Fig. 2 is a side view of a juice extractor mounted upon the cabinet motor drive.

Fig. 3 is a side view of a juice blender mounted upon the table top of the cabinet motor drive.

Fig. 4 is a perspective view of a meat grinding attachment being applied to the cabinet drive unit.

Fig. 5 is a fragmentary side sectional view showing the food mixer mounted upon the drive unit.

Fig. 6 is an end sectional view of the drive unit which is attached to the cabinet motor drive.

Fig. 7 is a sectional view taken along the lines 7—7 of Fig. 6.

Fig. 8 is a sectional view taken along the lines 8—8 of Fig. 6.

Fig. 9 is a sectional view taken along the lines 9—9 of Fig. 6.

Referring now in greater detail to the drawings, in which similar reference characters refer to similar parts, I show a multi-purpose kitchen appliance comprising a cabinet enclosed motor drive, generally designated as A, a detachable drive stand, generally designated as B, and a plurality of appliance elements, generally designated as C.

The cabinet enclosed motor drive A comprises a table-type kitchen cabinet 12 having a motor 14 suspended below table level by a bracket 16. The bracket 16, which is mounted upon the table surface by a flange 18, has at its upper portion a well 20 with downwardly converging ground sides 22 and a pan 24. A centrally located leakproof bearing in the pan through which the motor shaft 26 projects, serves to protect the motor from food spattering. At the upper portion of the shaft 26 is a fluted end 28 which is adapted to engage a complementary adapter in the removable drive unit B. The motor 14 is a conventional split phase A. C. type having suitable controls 30 for varying speed at table top level.

The detachable drive stand B is a lightweight multi-purpose unit comprising a housing 32 having a lower skirt-like projection 34 which is adapted to smoothly interfit with the downwardly converging sides 22 of the cabinet well 20. A drive shaft 36 is axially supported within the lower portion of the housing 32 and is centrally located with respect to the skirt-like projection 34. The shaft 36 has an internally fluted fitting 38 threaded upon its lower end which is adapted to engage the fluted end 28 of the cabinet motor drive A.

A pinion gear 40 affixed to the shaft 36 drives a parallel shaft 42 through a spur gear 44. The parallel shaft 42 is rotatably supported within a lower thrust bearing 46 and an upper ball bearing 48. At the upper end of the shaft 42 is mounted a secondary pinion gear 50 which, in turn, is in mesh with a secondary spur gear 52. The secondary spur gear 52 is secured to the lower end of a stub shaft 54, the latter being journaled in the housing 32 on an axis in line with the motor shaft 26 and the drive shaft 36. A sleeve 56 is keyed upon the upper of the stub shaft 54 and maintains the latter in a floating position within the housing 32 with the upper end of the shaft chamfered at 58 to engage the drive shafts of the appliance C. The center portion of the shaft 42 has a worm gear 60 which turns a ring gear 62 on a horizontal shaft 64. The horizontal shaft 64 is set at right angles to the axis of shafts 36 and 54, and is journaled at one end to a bearing 66, the other end terminating in a collar 68, which is also journaled in the housing 32. The collar 68 is slotted partially at 70 and projects into a machined orifice 72 at the side of housing 32. The diametral wall of the orifice 72 is adapted to accept the complementary flange (not shown) of a meat grinding attachment and securely hold the flange by a thumb screw 72. The grinder C4 itself is driven by interfitting its shaft with the slotted collar 70.

The upper portion of the housing 32 forms a conical throat 80 into which the appliance elements C are adapted to be retained. In Figs. 1 and 5, I show a cake mixer C1 mounted upon the detachable drive stand B. The cake mixer C1 comprises a frame 82 having a drive shaft 84 rotatably supported therein. The frame 82 has a conical flange 86 which is adapted to engage the conical orifice and the lower end 88 of the drive shaft 84 is slotted to receive the chamfered end 58 of the stub shaft 54. A pulley 90 is affixed to the shaft 84 and drives a belt 92 which turns the beaters.

The juice extractor C2 and the juice blender C3 each have a conical flange which is adapted to interfit with the throat 80 of the drive stand B and a shaft which engages the chamfered shaft end 58.

When any of the kitchen appliance units are not in use, they may be stored within the cabinet itself. The cabinet, at that time, may be covered with a lid (not shown) to present a clean upper surface on the cabinet. When it is desired to use any of the elements, the drive stand unit B is inserted within the well 20 on the kitchen cabinet and the skirt-like projection 34 is mounted within the downwardly converging sides 22. At this time, the internally fluted fitting 38 will engage the fluted end 28 at the cabinet motor drive A. The desired appliance element C is mounted in a similar fashion upon the top of the drive stand B. The entire appliance unit is then set in operation merely by selecting the proper speed by the table top motor controls 30.

Although my invention has been described in considerable detail, such description is intended to be illustrative rather than limiting, since the invention may be variously embodied, and the scope of the invention is to be determined as claimed.

I claim as my invention:

1. A multi-purpose kitchen appliance comprising a cabinet-enclosed motor drive, a detachable drive stand, and a plurality of appliance elements, said cabinet enclosed motor drive having a bracket suspending a motor below table top level, said bracket having a well therein with downwardly converging sides, a fluted shaft on said motor extending into said well, said detachable drive stand having gearing means adapted to be coupled with said motor drive, a downwardly extending skirt on said drive stand detachably interfitting with the downwardly converging sides on said bracket well, an internally fluted fitting on said gearing means in detachable joinder with said motor fluted shaft, said gearing means being detachably coupled to each of said appliance elements.

2. The kitchen appliance of claim 1, said gearing means comprising a pinion gear affixed to a drive shaft within a housing on said drive stand, a parallel shaft having a spur gear in mesh with said pinion gear, a secondary pinion gear in mesh with a secondary spur gear, said secondary spur gear being secured to a stub shaft chamfered to interfit with a complementary drive shaft on each of said appliance elements.

3. The kitchen appliance of claim 2, wherein a worm gear, mounted upon said parallel shaft is in mesh with a ring gear secured to a horizontal shaft within said housing, said horizontal shaft having a slotted coupling thereon projecting through said housing and detachably interfitting with a meat grinder appliance.

References Cited in the file of this patent

UNITED STATES PATENTS

| | | |
|---|---|---|
| 1,489,242 | Gilchrist | Apr. 8, 1924 |
| 1,944,245 | Krause | Jan. 23, 1934 |
| 2,698,164 | Lamb | Dec. 28, 1954 |